(12) United States Patent
Raskar et al.

(10) Patent No.: US 9,081,262 B2
(45) Date of Patent: Jul. 14, 2015

(54) METHODS AND APPARATUS FOR ULTRA-FAST CAMERA

(71) Applicants: Ramesh Raskar, Cambridge, MA (US); Andreas Velten, Madison, WI (US)

(72) Inventors: Ramesh Raskar, Cambridge, MA (US); Andreas Velten, Madison, WI (US)

(73) Assignee: Massachusetts Institute of Technology, Cambridge, MA (US)

( * ) Notice: Subject to any disclaimer, the term of this patent is extended or adjusted under 35 U.S.C. 154(b) by 291 days.

(21) Appl. No.: 13/646,719

(22) Filed: Oct. 7, 2012

(65) Prior Publication Data

US 2013/0100339 A1 Apr. 25, 2013

Related U.S. Application Data

(60) Provisional application No. 61/544,498, filed on Oct. 7, 2011.

(51) Int. Cl.
*G03B 17/17* (2006.01)
*G03B 15/00* (2006.01)
*G03B 39/00* (2006.01)
*H04N 5/225* (2006.01)

(52) U.S. Cl.
CPC ............... *G03B 17/17* (2013.01); *G03B 15/00* (2013.01); *G03B 39/005* (2013.01); *H04N 5/225* (2013.01); *H04N 5/2251* (2013.01)

(58) Field of Classification Search
CPC ............ G01J 2001/4486; G01J 2011/005
USPC ......... 250/208.1, 214.1, 214 R, 216, 214 VT, 250/214 DC; 348/272, 294, 260, 264, 266; 257/431
See application file for complete search history.

(56) References Cited

U.S. PATENT DOCUMENTS

| | | |
|---|---|---|
| 3,122,052 A | 2/1964 | Buck |
| 3,143,051 A | 8/1964 | Teeple |
| 4,215,274 A | 7/1980 | Segall |
| 4,404,470 A | 9/1983 | Wang |
| 5,231,401 A | 7/1993 | Kaman et al. |
| 5,807,262 A | 9/1998 | Papaioannou et al. |
| 6,876,723 B1 | 4/2005 | Celliers et al. |
| 7,227,116 B2 | 6/2007 | Gleckler |
| 7,492,511 B2 | 2/2009 | Knebel et al. |
| 7,534,984 B2 | 5/2009 | Gleckler |
| 2004/0149914 A1* | 8/2004 | Abrahamsson et al. ...... 250/343 |
| 2005/0099664 A1* | 5/2005 | Yamaoka ...................... 359/212 |
| 2006/0061770 A1 | 3/2006 | Erskine |
| 2007/0223076 A1* | 9/2007 | Knebel et al. ................. 359/196 |
| 2008/0185526 A1* | 8/2008 | Horak et al. .................. 250/353 |

(Continued)

OTHER PUBLICATIONS

Krishnan et al. ("Development of a multiphoton fluorescence lifetime imaging microscopy system using a streak camera", May 2003, Review of Scientific Instruments, vol. 74, No. 5).*

(Continued)

*Primary Examiner* — Francis M Legasse, Jr.
(74) *Attorney, Agent, or Firm* — Stephen R. Otis

(57) ABSTRACT

In exemplary implementations of this invention, a set of two scanning mirrors scans the one dimensional field of view of a streak camera across a scene. The mirrors are continuously moving while the camera takes streak images. Alternately, the mirrors may only between image captures. An illumination source or other captured event is synchronized with the camera so that for every streak image the scene looks different. The scanning assures that different parts of the scene are captured.

18 Claims, 2 Drawing Sheets

(56) References Cited

U.S. PATENT DOCUMENTS

2009/0201486 A1 8/2009 Cramblitt et al.
2010/0090127 A1 4/2010 Yekta et al.

OTHER PUBLICATIONS

Shiraga et al. ("Multi-imaging x-ray streak camera for ultrahigh-speed two-dimensional x-ray imaging of imploded core plasmas (invited)", Oct. 2004, Review of Scientific Instruments, vol. 75, No. 10).*
M. Hopkins, Electronic Streak Camera, United States Statutory Invention Registration US H1979 H, published Aug. 7, 2001.
Hardesty, L., 2011, Trillion-frame-per-second video, Dec. 13, 2011, Phys.org, accessed Dec. 22, 2014 at http://phys.org/print242975582.html.
Guide to Streak Cameras, p. 3, Hamamatsu Photonics, K.K., 2008, accessed Dec. 17, 2014 at http://www.hamamatsu.com/resources/pdf/sys/e_streakh.pdf.
Tutorial—X Ray Streak Cameras, ALSHub (Advanced Light Source User Portal) website, accessed Dec. 17, 2014 at http://xraysweb.lbl.gov/peem2/webpage/Project/TutorialStreak.shtml.
Universal Streak Camera C5680 Series, p. 3, Hamamatsu Photonics K.K., 2003, accessed online on Dec. 17, 2014 at http://www.datasheetcatalog.com/info_redirect/datasheets/270/157137_DS.pdf.shtml.
Corbett, J., et al., 2012, Injection Beam Dynamics in Spear3, accessed online on Dec. 17, 2014 at http://www.lanl.gov/conferences/biw10/preprints/TUPSM065_preprint.pdf.
Streak Camera Overview, pp. 3-6, accessed online on Dec. 17, 2014 at http://opto-mech.11e.rochester.edu/Training%20Material/General/streak%20cameras.pdf.
Streak Camera, by Laboratory of Plasma Studies, accessed online on Dec. 17, 2014 at http://www.lps.cornell.edu/index.php/machines/diagnostics/streak-camera.
O.L. Landen, 1992, High-resolution time- and two-dimensional space-resolved x-ray imaging of plasmas at NOVA. Review of Scientific Instruments, vol. 63, Issue 10, pp. 5075-5078 (1992).
H. Shiraga et al., 1995, Laser-imploded core structure observed by using two-dimensional x-ray imaging with 10-ps temporal resolution. Review of Scientific Instruments, vol. 66, Issue 1, pp. 722-724 (1995).

* cited by examiner

METHODS AND APPARATUS FOR ULTRA-FAST CAMERA

RELATED APPLICATIONS

This application is a non-provisional of, and claims the benefit of the filing date of, U.S. Provisional Application No. 61544498, filed Oct. 7, 2011, the entire disclosure of each of which is herein incorporated by reference.

STATEMENT REGARDING FEDERALLY SPONSORED RESEARCH OR DEVELOPMENT

This invention was made with government support under Contract No. W911NF-07-D-0004 awarded by the Army Research Office and under Contract No. N66001-10-1-4041 awarded by the Space and Naval Warfare Systems Center. The government has certain rights in this invention.
The above amendments do not add any new matter.

FIELD OF THE TECHNOLOGY

The present invention relates generally to imaging.

SUMMARY

A streak image captured by a streak camera is essentially a 1D movie that plots a one dimensional image (i.e. a line) versus time.

In exemplary implementations of this invention, a set of two scanning mirrors scans the one dimensional field of view of a streak camera across a scene. The mirrors are continuously moving while the camera takes streak images. Alternately, the mirrors may move only between image captures. An illumination source or other captured event is synchronized with the camera so that for every streak image the scene looks different.

In exemplary implementations of this invention, the scanning assures that different parts of the scene are captured. This solves at least three problems: First, an arbitrary resolution can be attained if the synchronization is good enough, by stitching together an arbitrary number of 1D movies. Second, scanning can be slow enough to capture enough light to get a good signal to noise ("SNR") ratios. For example, in a prototype implementation, the mirrors scanned a scene in about 1 hour. Third, by using scanning mirrors, the imaging system does not require a multi-slit streak tube.

In a prototype of this invention, scanning mirrors were used with a streak camera to produce movies of repetitive events at about $10^{12}$ frames per second with a time resolution of less than two picoseconds.

The above description of the present invention is just a summary. It is intended only to give a general introduction to some illustrative implementations of this invention. It does not describe all of the details of this invention. This invention may be implemented in many other ways.

The above Figures illustrate some illustrative implementations of this invention, or provide information that relates to those implementations. However, this invention may be implemented in many other ways. The above Figures do not show all of the details of this invention.

DETAILED DESCRIPTION

Figure 1:
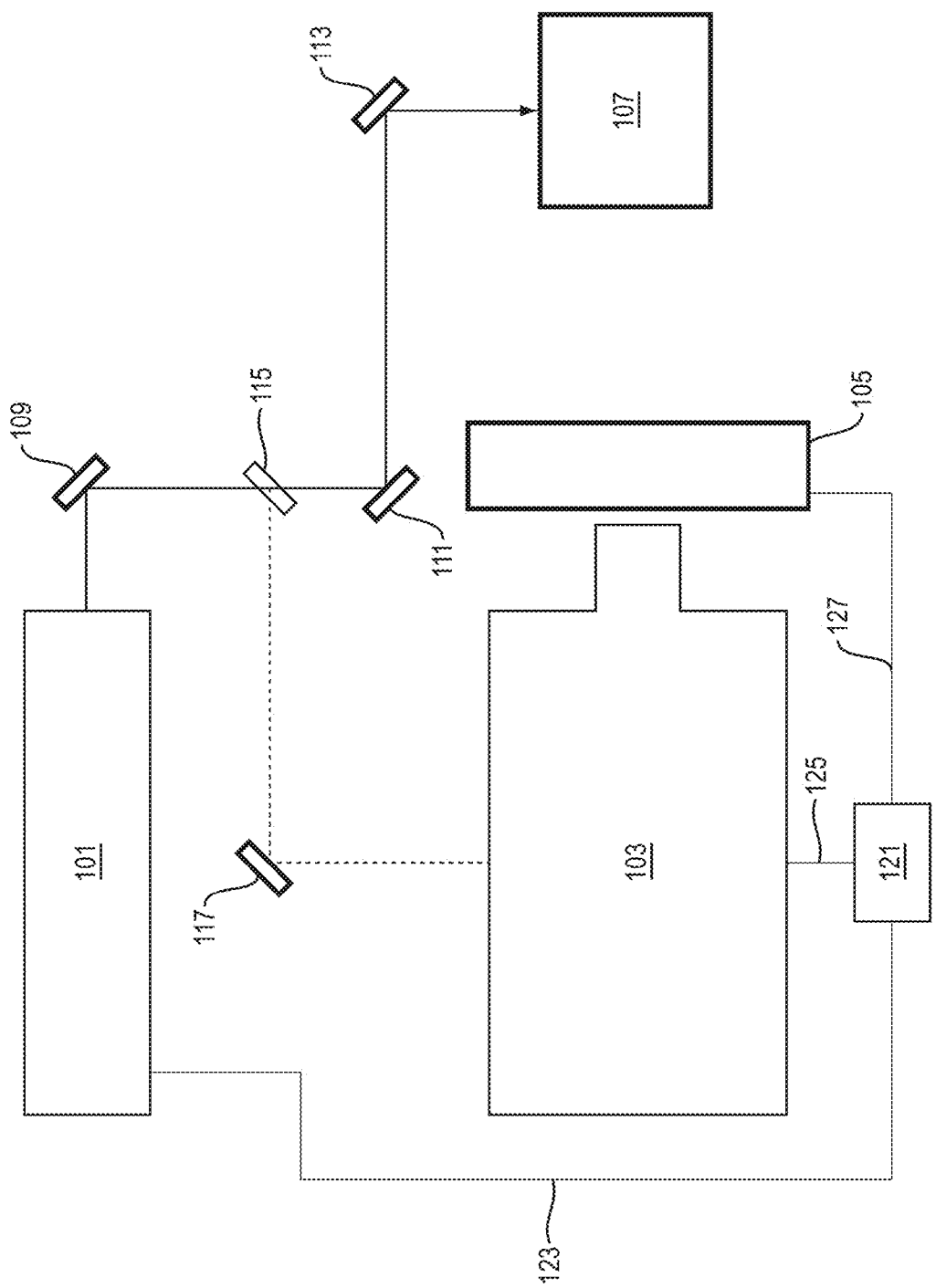
FIG. 1 is a high level block diagram of an ultra-fast imaging system.

FIG. 1 is a high level block diagram of an ultra-fast imaging system, in an exemplary implementation of this invention. A pulse laser 101 emits a laser beam that is steered by steering mirrors 109, 111, 113 to illuminate a scene 107. Scanning mirrors 105 scan the field of view of a streak camera 103 across the scene 107 while the streak camera 103 captures a series of images. At least one processor 121 is connected by wire connections 123, 125, 127 to the laser 101, streak camera 103 and the servo motors for the scanning mirrors 105, respectively.

Figure 2:
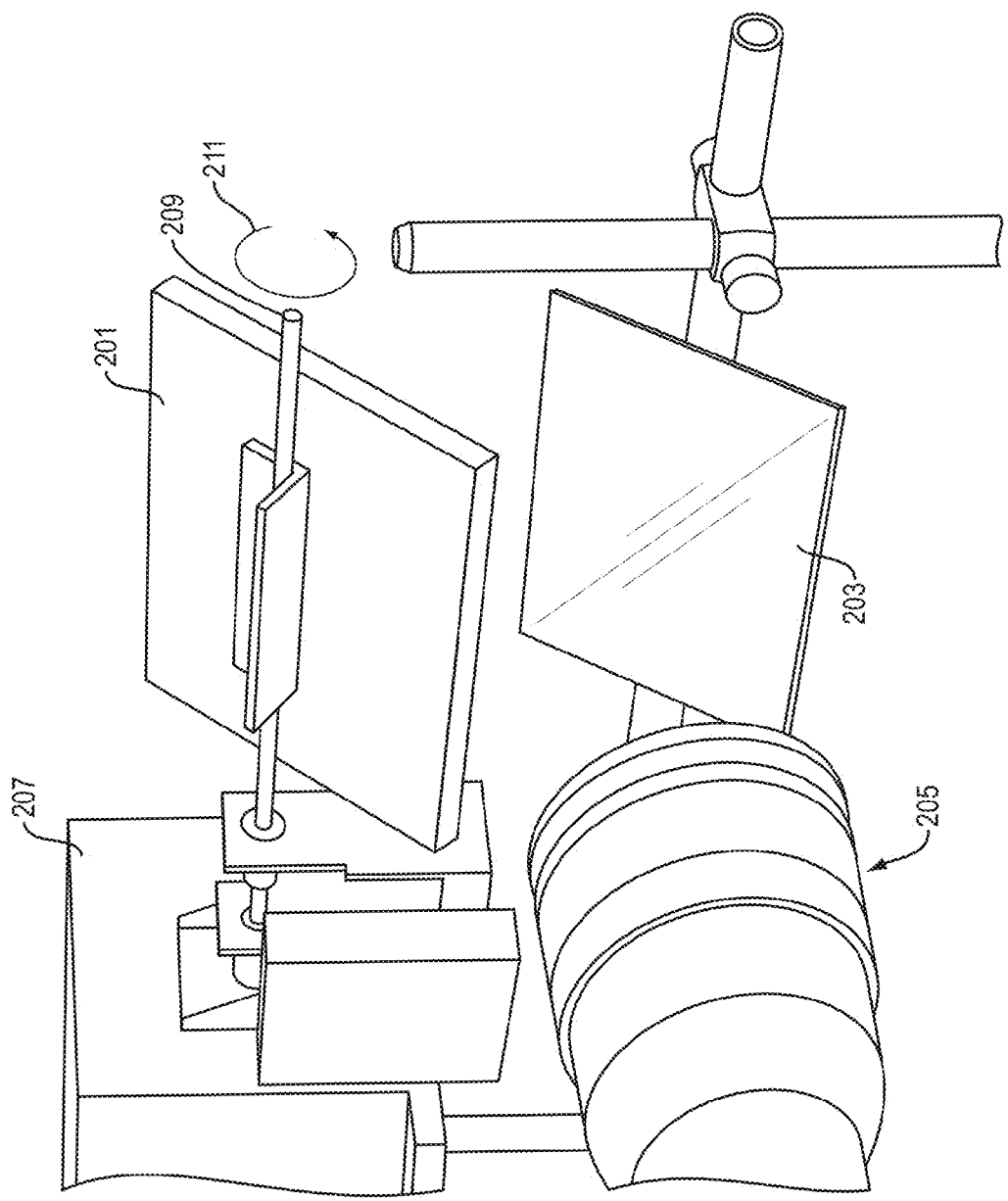
FIG. 2 is a perspective view of part of an ultra-fast imaging system.

FIG. 2 is a perspective view of part of an ultra-fast imaging system, in an exemplary implementation of this invention. Scanning mirrors comprise a rotating mirror 201 and a fixed mirror 203. A gearbox and servo motor 207 actuate rotation 211 of a shaft 209, causing the rotating mirror 201 to rotate about the longitudinal axis of the shaft 209. As rotating mirror 201 rotates, it scans the field of view of a streak camera 205 across a scene. Light from the scene travels to the rotating mirror 201, then to the fixed mirror 203, then to the objective of the streak camera 205.

In exemplary implementations of this invention, a scene is illuminated by a pulsed laser, and observations are made by a streak camera, which has a one-dimensional (horizontal only) field of view. A mirror system then scans the camera field of view vertically to capture a series of x-t streak images, one for each row of the scene. Scanning thus requires a stable pulse train for these repeated measurements. The field of view and total duration of the movies captured are limited by the total time available for the capture process, which in turn is limited practically by the long-term system stability to environmental noise. The lateral resolution is limited by diffraction limits, given by the lens aperture and operating wavelength.

In a prototype of this invention, captured x-t images are combined into one matrix, $M_{ijk}$, where $i=1 \ldots 672$ and $j=1 \ldots 512$ are the dimensions of the individual streak images and $k=1 \ldots 1000$ address the line images. For a given time point j, the sub matrix $N_{ik}$ contains a two-dimensional image x-y of the scene with a resolution of 672×1000 pixels, exposed over 2 ps. To display information contained in this matrix, the $N_{ik}$ information is rendered as frames of a movie. The y resolution of 1000 pixels is a result of the speed of the scanning mirror, the length of the image exposures, and the height of the scene. In this prototype, they resolution was selected to be about equal to the resolution in x, which is dictated by the streak camera.

In a prototype of this invention, a Kerr lens mode-locked Ti:Sapphire laser emits 8 nJ, 50 fs long pulses at a center wavelength of 795 nm and a 75 MHz repetition rate. Because all the pulses are statistically identical, the scattered light from many of them can be recorded and the measurements can be integrated to average out noise. To synchronize the streak camera (Hamamatsu® C5680) and the laser, a portion of the beam is split off a glass slide and directed it onto a fast photodetector connected to the camera. The camera has an x-t resolution of 672×512 samples over a window of about 1 ns (i.e. less than 2 ps per sample). The system integrates light for 6 s for each movie scan line to optimize SNR and minimize vibration error from motor or mirror movement. Alternatively, a brighter laser could be used, or camera gain increased.

In a prototype of this invention, the scanning mirrors are two 9 cm×13 cm metal mirrors placed above one another. The top mirror deflects the light coming from the scene downwards and the bottom one directs it onto the streak camera objective.

In this prototype, to obtain data for a full movie, the mirror-scanning system (comprising the two 9 cm×13 cm metal mirrors) rotates the camera's center of projection, and the camera records horizontal slices of a scene sequentially. A computer-controlled, 1 rpm servo motor rotates one of the mirrors and consequently scans the field of view vertically. With high gear ratios (up to 1:1000), the continuous rotation of the mirror is slow enough to allow the camera to record each line for about six seconds, requiring about two hours for 1000 lines. The rotating mirror can spin continuously at speeds of down to 0.006 degrees per hour.

In some implementations of this invention, a tunable light source may be used. Or a set of different color light sources may be used to provide spectral information.

A streak camera image provides the temporal evolution of a line in the scene and can be converted into a one dimensional movie. In exemplary implementations of this invention, two dimensional movies can also be obtained: A mirror system scans the field of view of the camera across the scene while the camera captures a series of images. Since the laser and camera are synchronized, the captured images can be combined to obtain a two dimensional movie of the scene.

In exemplary implementations of this invention, the captured movies are constructed from a large number of images of repetitive events. Thus, larger time ranges, higher resolutions and larger fields of view can be achieved by concatenating individual movies. For example, after capturing and compiling one movie, trigger delay may be adjusted by slightly less than one nanosecond, and a second movie may be captured and compiled. The two movies can then be stitched together and played in sequence.

The camera's field of view may be increased by capturing multiple movies and stitching and correcting them, roughly analogous to a panorama picture. Resolution may be increased by using a zoom lens with a smaller field of view but higher resolution and then stitching together multiple movies.

In some implementations of this invention, movies are captured in a single shot. If the camera and light source are synchronized by an ordinary trigger and the imaged event is bright enough, it is possible to avoid the integration of several pulses in the streak camera. In order to simultaneously capture several lines of a movie, pixels may be remapped from a set of lines to the one dimensional field of view of the streak camera.

In exemplary implementations of this invention, one or more processors are configured for, among other things: (1) outputting control signals to control the servo motor that rotates the scanning mirrors and to control other components of the imaging system, including the pulse source (e.g., laser), sensor (e.g., streak camera), apparatus for steering the pulses (e.g., galvanometer actuated mirrors), (2) receiving and analyzing input, including sensor data and user input, and (3) performing computations and executing software. Each of the one or more processors may be located in, adjacent to or remote from the other components of the imaging system (e.g., other processors, servo motor, streak camera or laser) and may be connected by wire or wirelessly with such other components.

This invention has many applications.

For example, in prototype implementations, this invention has been used (1) to observe the propagation of light pulses through macroscopic scenes revealing complex light paths and sub-surface scattering, and (2) to identify a specular reflector (e.g., mirror) in the scene being imaged. Also, for example, a prototype of this invention has been used in an ultra-fast imaging system for recording and reconstructing space-time world voxels of incoherent light propagation in table top scenes.

In some implementations, this invention may be used for analysis of multibounce light transport, and to observe non-linear effects, e.g., multi-photon fluorescence, filamentation, plasma formation, and soliton interaction. Further, in some implementations, this invention may be used to observe ultrafast propagation through scenes, and thus may be used for imaging around corners and characterizing materials. Further, in some implementations, this invention may be integrated with computer graphics, medical imaging, and remote sensing, as well as other wave systems, such as sonar and radio.

Variations:

This invention may be implemented in many different ways. Here are some non-limiting examples.

This invention is not limited to light, but may use any type of wave, including electromagnetic radiation and mechanical waves (e.g., sound waves). For example, the wave may include sound that is infrasonic (i.e., less than 20 Hz) or ultrasonic (i.e., greater than 20 kilohertz).

This invention is not limited to any particular wave frequency, pulse duration, or duration of interval between onsets of successive pulses. For example, in the case of electromagnetic radiation, this invention is not limited to visible light, but may use electromagnetic radiation of any frequency, including frequencies approximately in the millimeter, terrahertz, visible, or radar range of frequencies.

This invention may be implemented as apparatus comprising, in combination: (a) a streak camera, which streak camera has a field of view; and (b) one or more scanning mirrors for scanning the field of view of the streak camera across a scene, while the streak camera captures images of the scene. Furthermore: (1) the scanning mirrors may comprise a first mirror and a second mirror, the first mirror being configured to rotate about an axis of rotation and the second mirror being fixed relative to the streak camera; (2) the streak camera may have an objective; the first mirror may be configured to reflect light from the scene toward the second mirror; and the second mirror may be positioned, relative to the objective, to reflect light from the first mirror toward the objective; (3) the apparatus may further comprise an elongated shaft; the longitudinal axis of the shaft may be co-linear with the axis of rotation; the first mirror may be operatively connected to the shaft; and the shaft may be configured to rotate about the axis of rotation; (4) the apparatus may further comprise a motor and gears for actuating rotation of the shaft; (5) the apparatus may further comprise an illumination source for illuminating the scene; (6) the illumination source may comprise a pulse laser; (7) the apparatus may further comprise one or more mirrors for steering, toward the scene, pulses emitted by the laser; and (8) the apparatus may further comprise a beamsplitter for directing a portion of light from the laser to a photodetector, for synchronizing the laser with the streak camera.

This invention may be implemented as an imaging method, wherein: (a) a streak camera has a field of view, and (b) one or more scanning mirrors scan the field of view of the streak camera across a scene, while the streak camera captures images of the scene.

DEFINITIONS AND CLARIFICATIONS

Here are a few definitions and clarifications. As used herein:

The terms "a" and "an", when modifying a noun, do not imply that only one of the noun exists.

The fact that an "example" or multiple examples of something are given does not imply that they are the only instances of that thing. An example (or a group of examples) is merely a non-exhaustive and non-limiting illustration.

The term "field of view" shall be construed broadly. The term "field of view" includes the extent of a scene that is imaged by a sensor. The term "field of view" is not limited to visible light. A sensor that captures data regarding other types of electromagnetic radiation may have a "field of view".

The noun "image" includes (1) a streak image, or (2) a data set regarding both time of arrival of, and intensity in a spatial dimension of, a wave incident on a sensor. The verb "image" (and grammatical variations thereof) shall be construed accordingly. The term "image" is not limited to visible light, but also applies to other types of electromagnetic radiation.

The terms "include", "includes" and "including" shall be construed broadly, as if followed by "without limitation". The term "e.g." means including.

The term "light" is not limited to visible light, but includes electromagnetic radiation of any frequency. Similar terms, such as "illumination", "illuminate" and "shine", shall be construed broadly in the same manner. For example, an "illumination source" is a source of electromagnetic radiation.

The term "mirror" shall be construed broadly. For example, the term "mirror" includes (1) any specular reflector, and (2) any surface that reflects a ray or wave in a manner such that the angle of incidence at the surface equals the angle of reflection from the surface (both angles being relative to a line through the point of incidence in a direction normal to the surface). A "mirror" may reflect visible light, or other types of electromagnetic radiation.

The term "or" is an inclusive disjunctive. For example "A or B" is true if A is true, or B is true, or both A or B are true.

A parenthesis is simply to make text easier to read, by indicating a grouping of words. A parenthesis does not mean that the parenthetical material is optional or can be ignored.

The term "pixel" shall be broadly construed. A "pixel" includes (1) a pixel in a display device, (2) a sensel in a sensor, (3) a single sensor element of an array of sensors, such as in a charge-coupled device, and (4) the smallest subdivision of a sensor plane of a sensor, which subdivision can take a sensor measurement. The term "pixel" is not limited to a device that emits or detects visible light. A device that emits or detects any type of electromagnetic radiation may have pixels.

The phrase "scanning a camera's field of view across a scene" (and like phrases) includes scanning an optical element (e.g., a lens or mirror) that is configured for adjusting or steering the camera's field of view.

Two values are "substantially" equal if they differ by less than 10%.

Two values differ "substantially" if they differ by 10% or more.

Two values x and y differ by a certain percent, if [(x−y)/x]×100 equals that certain percent, where x is the larger of the two values and y is the smaller of the two values.

CONCLUSION

It is to be understood that the methods and apparatus which have been described above are merely illustrative applications of the principles of the invention. Numerous modifications may be made by those skilled in the art without departing from the scope of the invention. The scope of the invention is not to be limited except by the claims that follow.

What is claimed is:

1. Apparatus comprising, in combination:
   (a) a pulsed illumination source;
   (b) a streak camera, which streak camera has a one-dimensional field of view; and
   (c) one or more scanning mirrors;
   wherein the apparatus is configured to capture streak images of a repetitive event, such that
      (i) for each repetition of the repetitive event, the one or more scanning mirrors scan the one-dimensional field of view of the streak camera across a scene, while the streak camera captures streak images of the scene that are combined to form a two-dimensional movie of the scene; and
      (ii) the two-dimensional movies of the respective repetitions are combined.

2. The apparatus of claim 1, wherein movies of the repetitive event are taken at different time delays and combined to form a movie that has a longer time duration.

3. The apparatus of claim 1, wherein combining the two-dimensional movies increases field of view.

4. The apparatus of claim 3, wherein the apparatus further comprises a zoom lens that increases resolution.

5. The apparatus of claim 1, wherein the pulsed illumination source and streak camera are synchronized with each other.

6. The apparatus of claim 1, wherein each respective streak image captures a single row of the scene and different portions of the respective streak image show the row at different points of time.

7. The apparatus of claim 6, wherein the pulsed illumination source comprises a pulse laser.

8. The apparatus of claim 7, further comprising one or more mirrors for steering, toward the scene, pulses emitted by the laser.

9. The apparatus of claim 8, further comprising a beam-splitter for directing a portion of light from the laser to a photodetector, for synchronizing the laser with the streak camera.

10. A method comprising, in combination:
    (a) using a pulsed illumination source to illuminate a scene with pulses of light;
    (b) using a streak camera that has a one-dimensional field of view to capture streak images of a repetitive event, such that for each repetition of the repetitive event, the one or more scanning mirrors scan the one-dimensional field of view of the streak camera across the scene, while the streak camera captures the streak images of the scene that are combined into a two-dimensional movie; and
    (c) combining the two-dimensional movies of the respective repetitions.

11. The method of claim 10, wherein movies of the repetitive event are taken at different time delays and combined to form a movie that has a longer time duration.

12. The method of claim 10, wherein combining the two-dimensional movies increases field of view.

13. The method of claim 12, wherein the apparatus further comprises a zoom lens that increases resolution.

14. The method of claim 10, wherein the movies have a time resolution of less than two picoseconds.

15. The method of claim 10, wherein the scanning mirrors move continuously while the streak camera captures the streak images.

16. The method of claim 10, wherein the scanning mirrors move only between image captures.

17. The method of claim 10, wherein the pulsed illumination source and the streak camera are synchronized with each other.

18. The method of claim 10, wherein each respective streak image captures a single line of the scene and different portions of the respective streak image show the line at different points of time.

* * * * *